INVENTORS
WILLIAM J. EMMONS
BERNARD S. GALLAGHER
BY
ATTORNEY

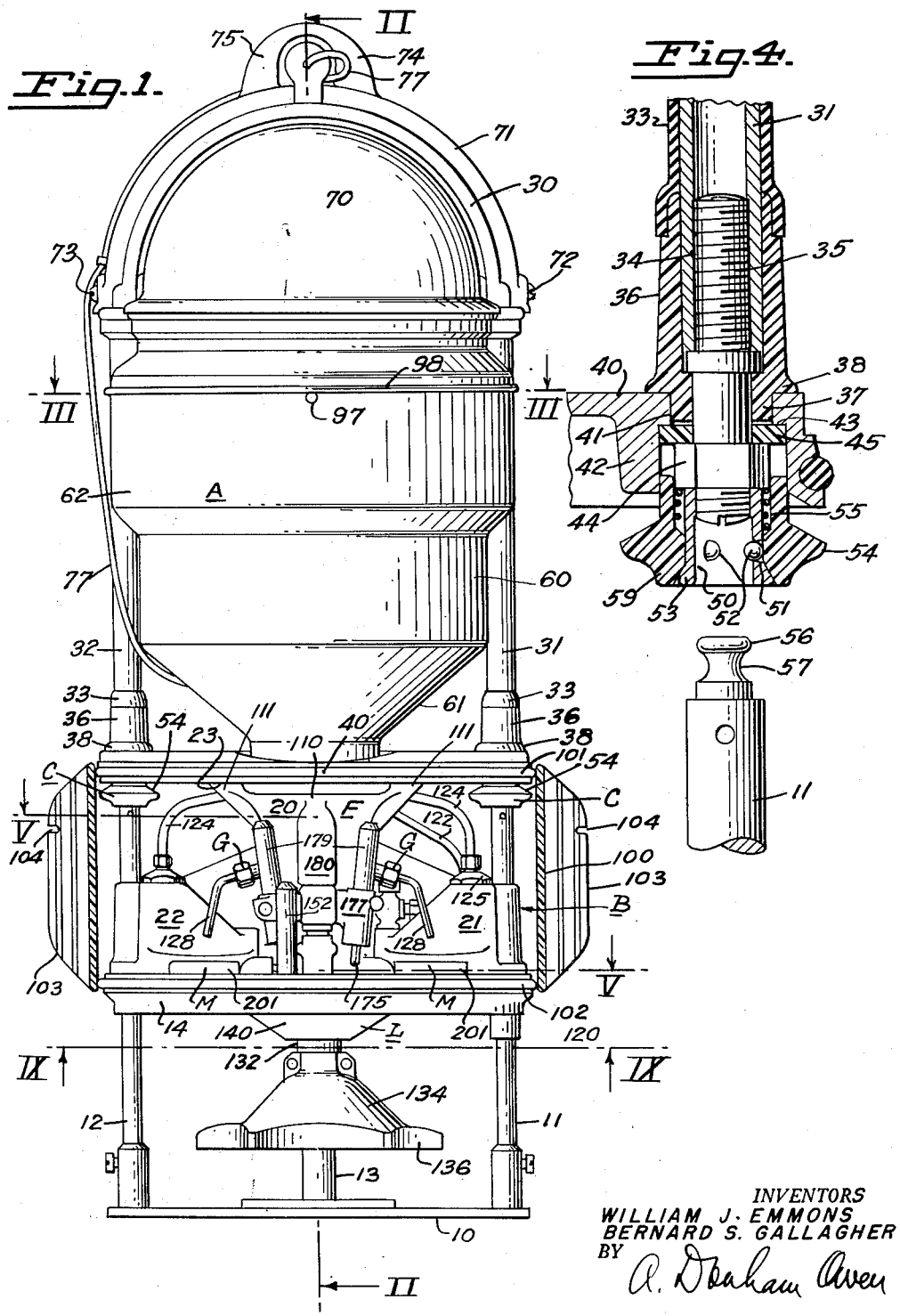

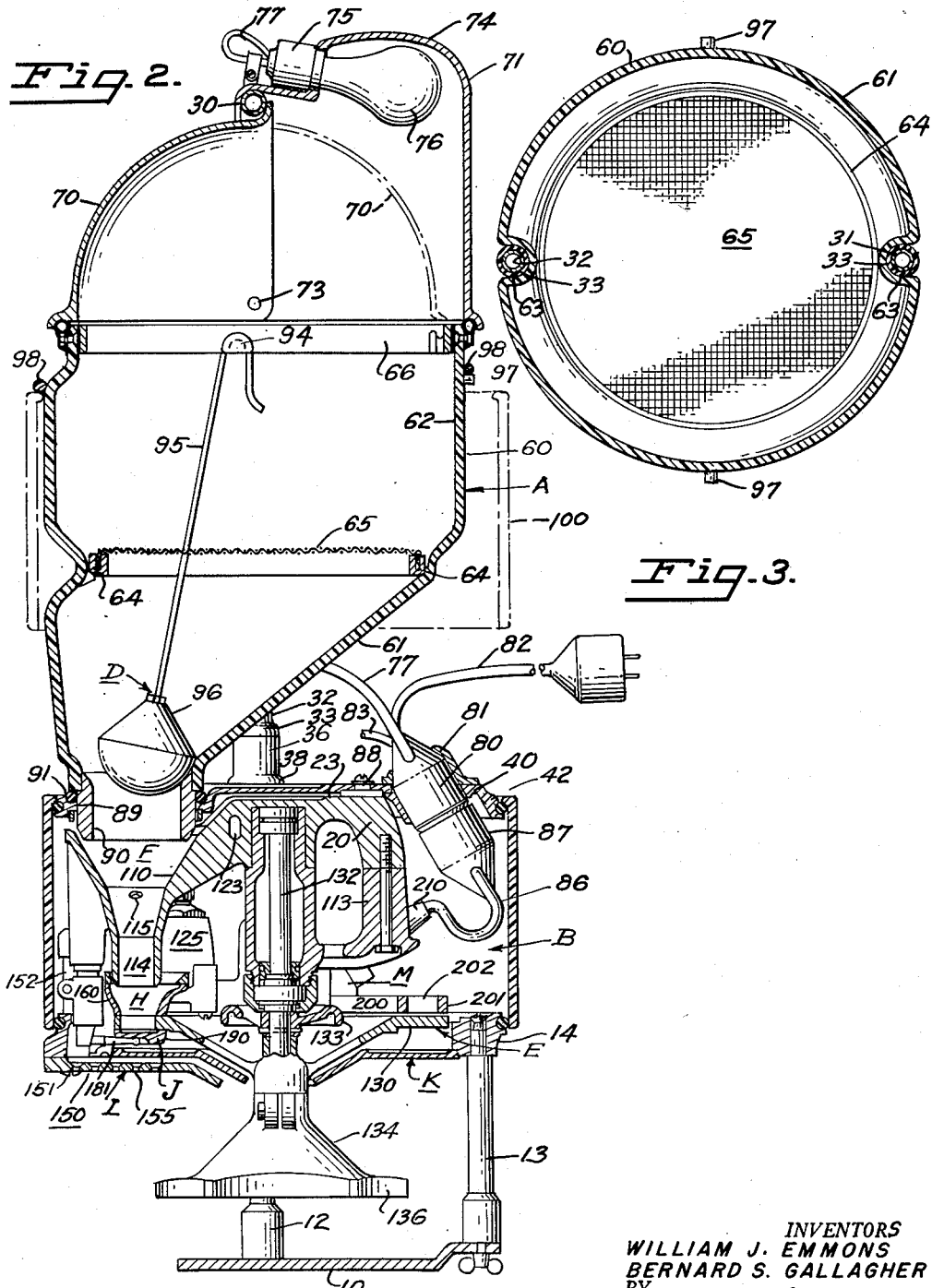

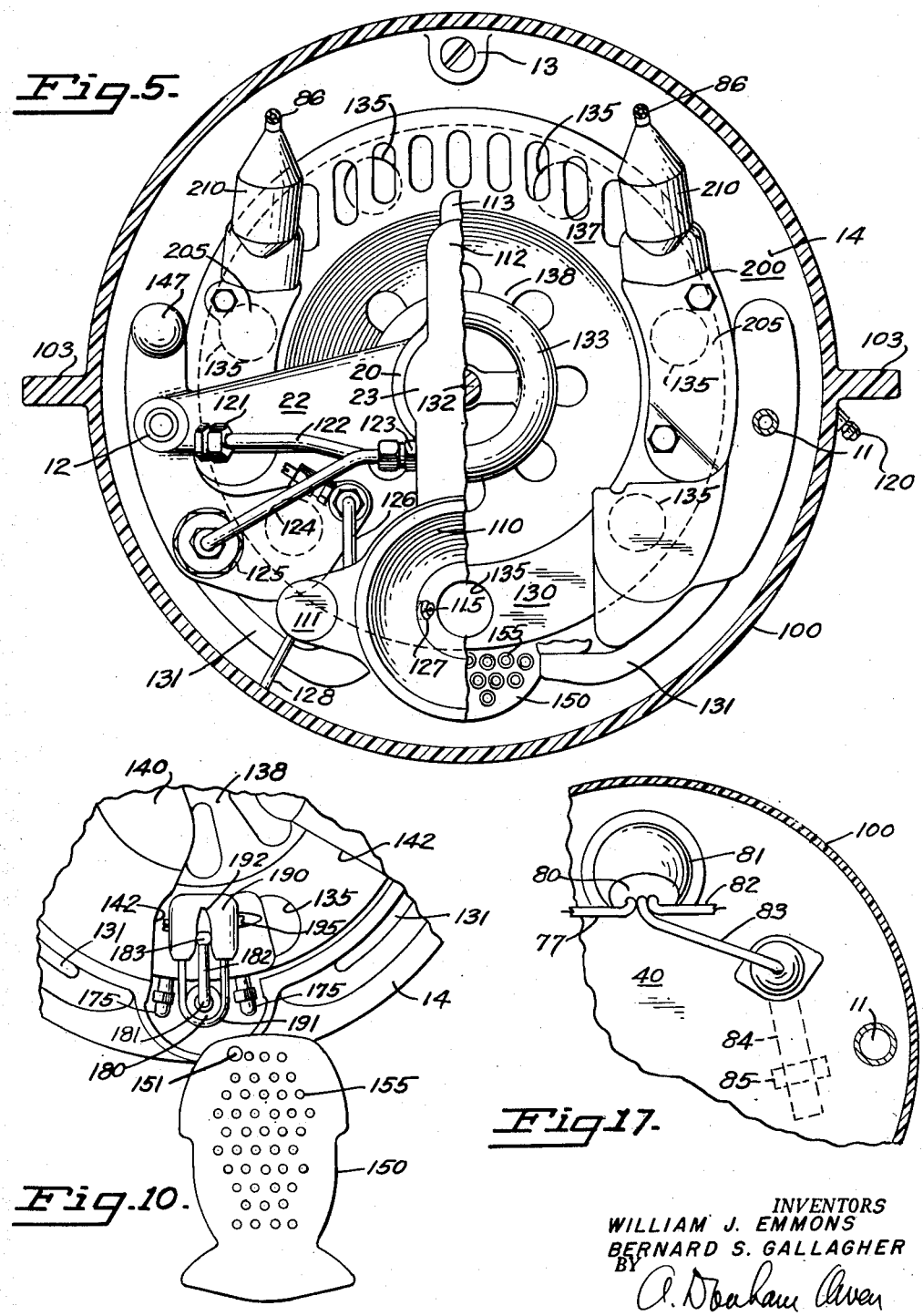

March 23, 1954  W. J. EMMONS ET AL  2,673,006
DISPENSING APPARATUS
Filed April 16, 1948  7 Sheets-Sheet 5
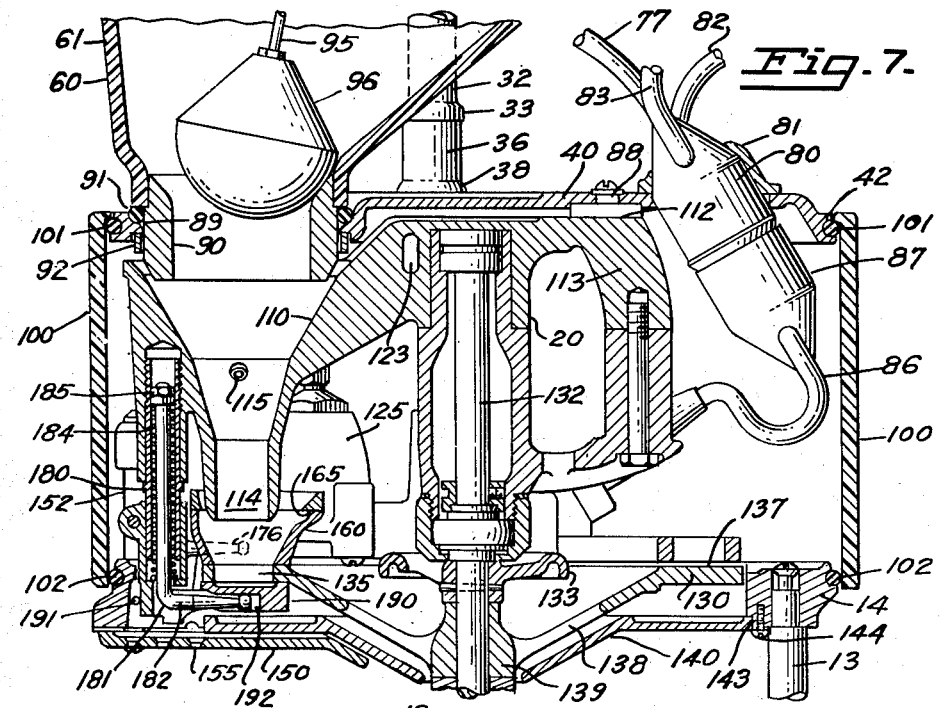
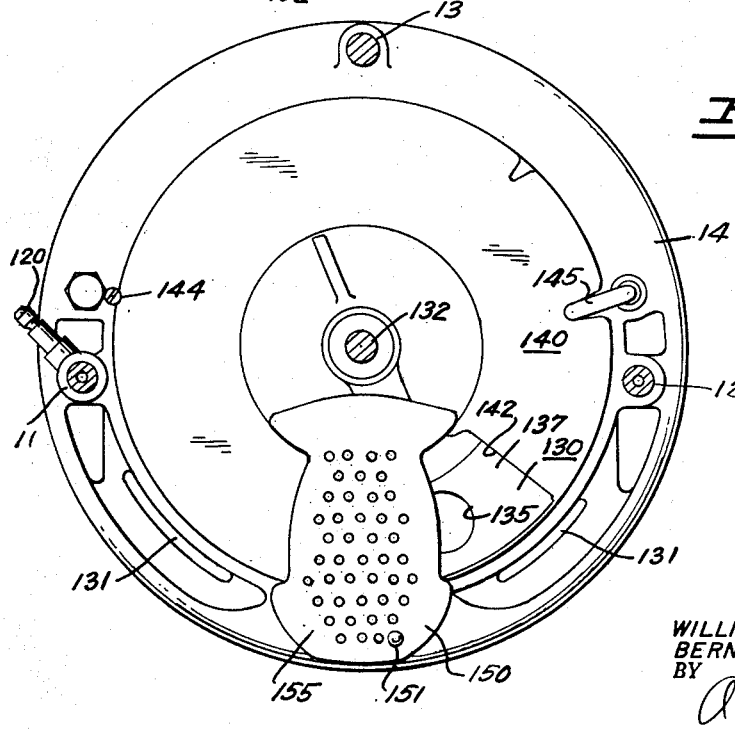
INVENTORS
WILLIAM J. EMMONS
BERNARD S. GALLAGHER
BY
ATTORNEY March 23, 1954
W. J. EMMONS ET AL
2,673,006
DISPENSING APPARATUS
Filed April 16, 1948
7 Sheets-Sheet 6
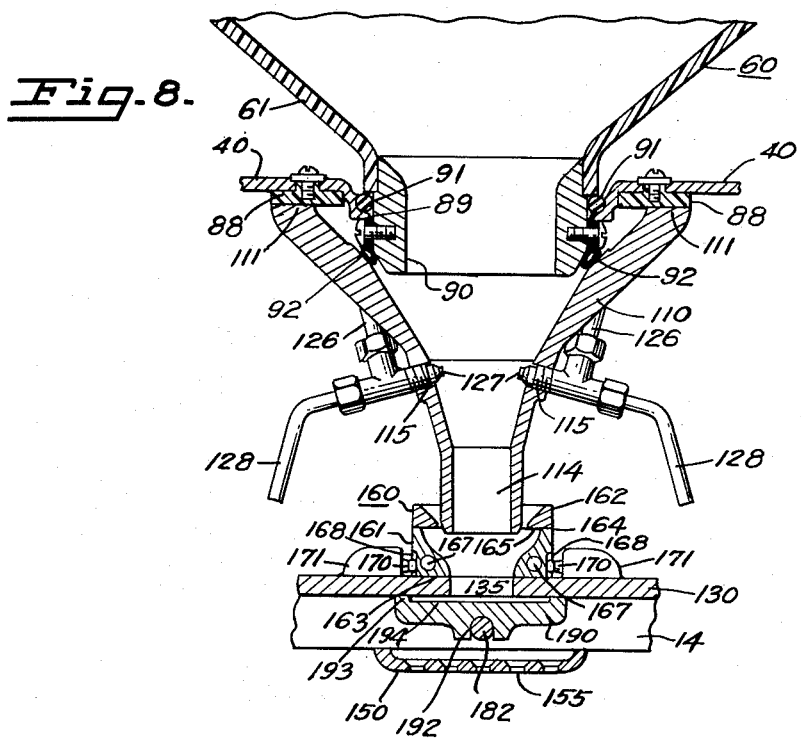
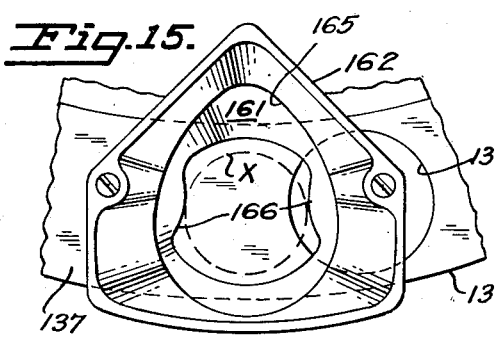
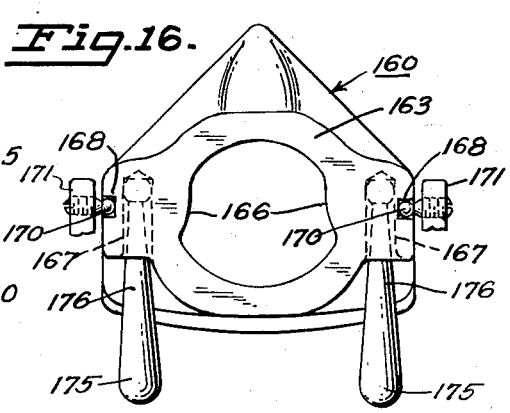
INVENTORS
WILLIAM J. EMMONS
BERNARD S. GALLAGHER
BY
ATTORNEY

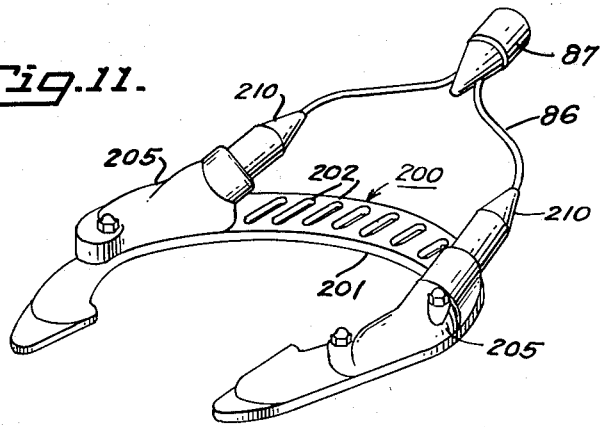
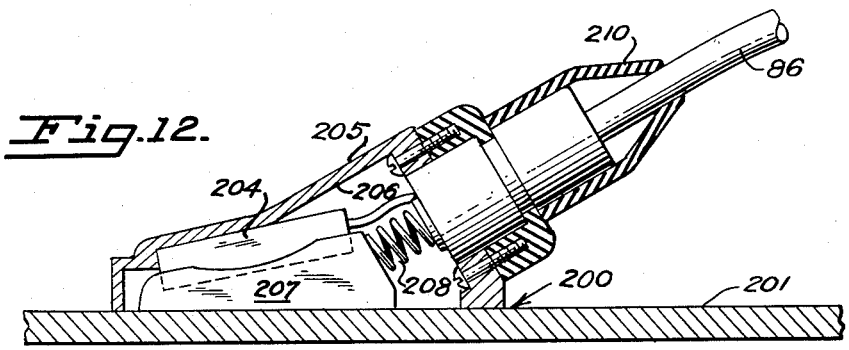
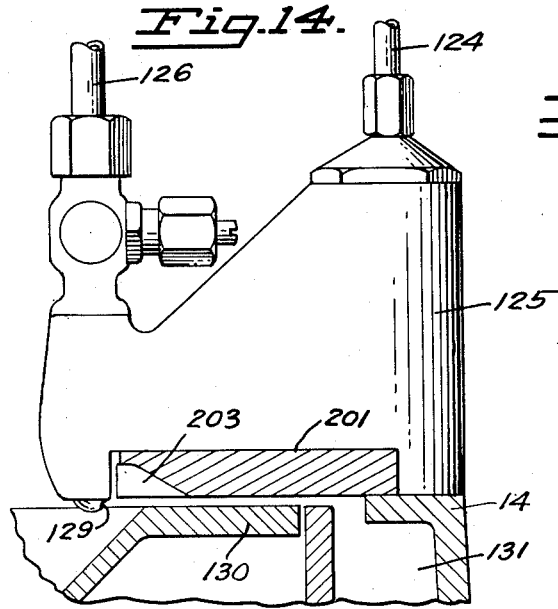
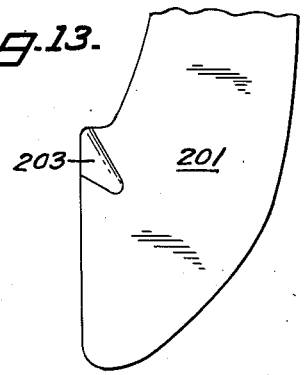

Patented Mar. 23, 1954

2,673,006

UNITED STATES PATENT OFFICE 2,673,006

DISPENSING APPARATUS

William J. Emmons, Alameda, and Bernard S. Gallagher, Piedmont, Calif., assignors to Salter Machine Company, Oakland, Calif., a corporation of California Application April 16, 1948, Serial No. 21,374

17 Claims. (Cl. 222—146)

This invention relates to an improved dispenser. More particularly the invention relates to an improved machine for dispensing metered amounts of subdivided material. Also the invention is directed to an apparatus suitable for storing subdivided hygroscopic material and for dispensing a measured quantity of said material into each of a moving line of containers.

A division of this application claiming some of the subject matter herein claimed was filed on July 18, 1949, Serial No. 109,799.

The apparatus which we have invented is especially useful in a cannery as a machine for storing granular sodium chloride or granular calcium chloride and dispensing a measured amount of either directly into each can, either before or after the can has been filled with food products.

Heretofore it has been difficult to store, measure, and dispense hygroscopic materials in the moist air of a cannery. The available machines were either unsuited to large scale, rapid operation or were unable to keep hygroscopic salts dry enough so that they would flow. Moreover, the machines tended to be complicated. They were expensive, difficult to assemble and disassemble, and hard to keep clean. The hoppers often became clogged by the salt, and, since the machines were closed, it was necessary to look inside the machine frequently in order to see whether the hopper was clogged or empty. In spite of regular examinations, it often happened that many cans received no salt before the clogged or empty condition of the hopper was discovered.

One object of this invention is to provide a highly efficient apparatus for holding, measuring, and dispensing hygroscopic materials.

Another object of the invention is to provide a dispenser which is easily cleaned, and is especially adapted to being cleaned by washing with water, steam or air.

Another object of the invention is to provide a dispenser for hygroscopic materials which is so constructed as always to be subject to visual inspection.

Another object of the invention is to provide a dispenser for hygroscopic materials in which the hopper can be closed off, withdrawn from the measuring and dispensing portions of the apparatus, and used for dry storage of the material.

A further object of the invention is to provide a dispenser having a specially constructed non-clogging magazine beneath the hopper.

Another object of the invention is to provide a novel heating unit which may be used to maintain arid conditions inside a dispenser for hygroscopic materials.

A further object of the invention is to provide a self-contained, removable heating unit for a dispensing apparatus.

Still another object of the invention is to provide an apparatus which is adaptable for storing, measuring, and dispensing a large variety of materials.

A further object of the invention is to provide a hopper having means to maintain an even pressure in and an even flow through the bottom of the hopper.

Another object of the invention is to provide a dispenser for hygroscopic materials having means associated therewith for warding off steam which would moisten the materials.

Other objects and advantages of the invention will appear from the following description. A preferred embodiment is decribed in detail, in accordance with the provisions of U. S. Revised Statutes, sec. 4888, but it is not intended thereby to limit the claims thereto.

In the drawings:

Fig. 1 is a view in front elevation of a device embodying the principles of the invention;

Fig. 2 is a view in elevation and in section, taken along the line II—II of Fig. 1;

Fig. 3 is a view taken along the line III—III in Fig. 1;

Fig. 4 is an enlarged detail view, partly in section, of the linkage between the upper and lower frame portions;

Fig. 5 is an enlarged view taken on the line V—V in Fig. 1;

Fig. 7 is an enlarged view of the bottom portion of Fig. 2, the scale corresponding to that of Fig. 5;

Fig. 8 is an enlarged detail view in section of a portion of the dispensing apparatus, the scale corresponding to that of Fig. 5;

Fig. 9 is a view, somewhat enlarged, taken on the line IX—IX of Fig. 1;

Fig. 10 is a view similar to and on the same scale as Fig. 9, showing a portion of the apparatus with the swing shield swung to its outward position;

Fig. 11 is a view in perspective of the heating unit;

Fig. 12 is an enlarged detail view in elevation and in section of a portion of the heating unit;

Fig. 13 is an enlarged detail view of the under side of one portion of the heater plate;

Fig. 14 is a view, partly in section, of that portion of the machine where the air scavenging current crosses the metering disc underneath the heater and goes out through a slit in the base ring;

Fig. 15 is a top plan view of the magazine;

Fig. 16 is a bottom plan view of the magazine;

Fig. 17 is a plan view of a portion of the upper closure plate of the dispensing chamber.

Figure 6:
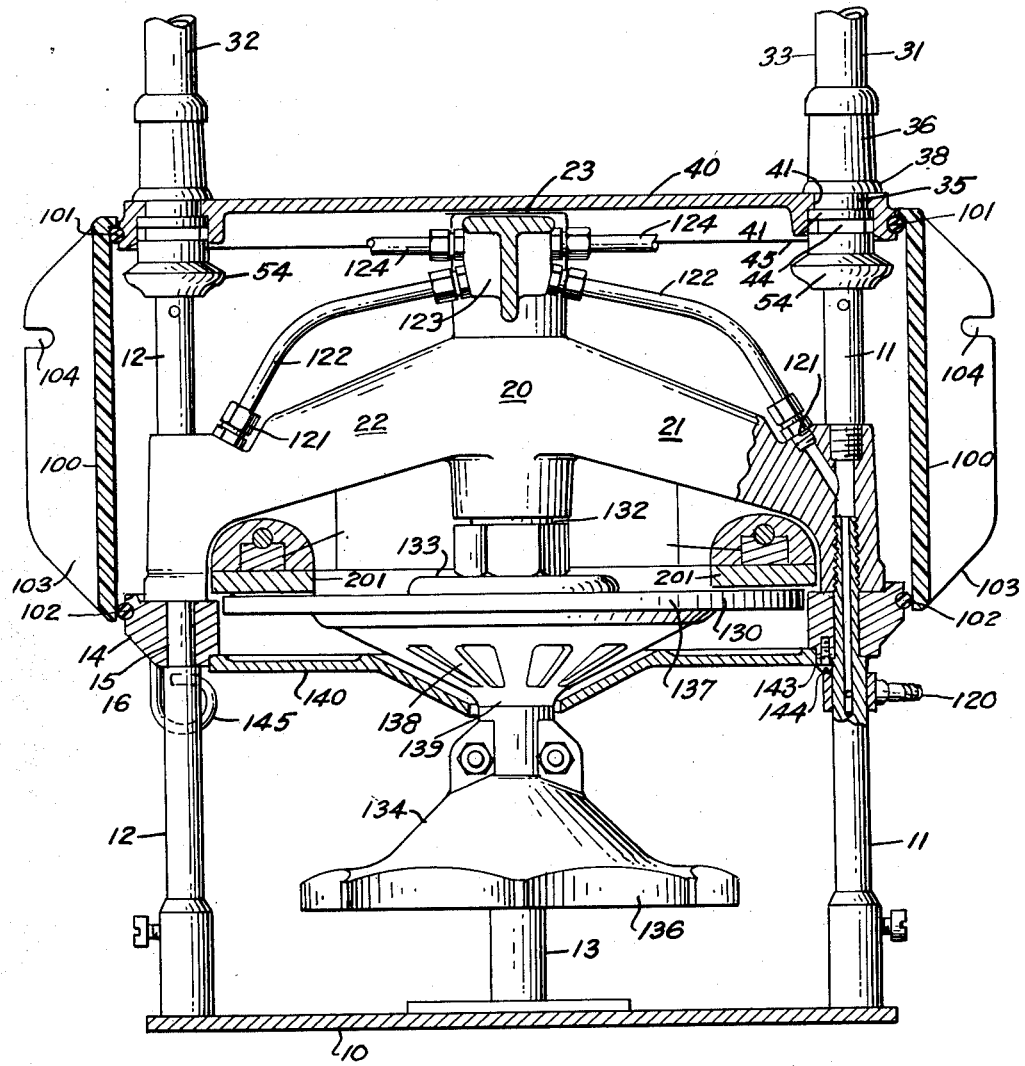
Fig. 6 is an enlarged view of the bottom portion of Fig. 1, the scale corresponding to that of Fig. 5.

The machine as shown comprises broadly an enclosed hopper unit A adapted to have its humidity under control regardless of the humidity of the area in which the machine is in use; and below it a dispensing unit B adapted to be secured alongside a can line in a cannery and to drop into each can a measured amount of flavoring as the can goes by.

The hopper unit includes means C for detachably securing it to the dispensing unit; and means D for shutting its outlet when the units are apart and are stored separately.

The dispensing unit includes a measuring disc E, a funnel F with agitating means G, a magazine H to assure level measurement in the top of the measuring disc, a floating shoe J on the bottom of the measuring disc, shields K and L, and heating means M to keep the parts hot and free of moisture. A more detailed description follows.

The general framework

The entire apparatus is usually supported above a base plate 10, on three standards 11, 12, and 13, and is adapted to be placed beside a can conveyor for step-by-step rotation by contact with each passing container.

Held by the standards at a level high enough to give ample clearance to moving containers is a horizontal base ring 14. The short rear standard 13 terminates adjacent to the ring 14 (see Figs. 2 and 7), but the side standards 11 and 12 extend through and above it (see Figs. 1 and 6), being inset at 15 to provide flanges 16 on which the ring 14 rests.

On the base ring 14 is mounted a central frame member 20. Its two legs 21 and 22 rest on the ring 14 and are positioned by the standards 11 and 12, which extend through them and terminate above them at substantially the level of the upper surface 23 of the frame 20. All the measuring and dispensing machinery is supported by the ring 14 and frame 20.

Above the center frame 20 is mounted the hopper or storage portion of the apparatus. A tubular metal frame 30, shaped like an inverted U with its legs 31 and 32 resting on the standards 11 and 12, supports the hopper 60 and the plate 40 which closes the upper end of the measuring and dispensing chamber. Each leg 31 and 32 of the tubular hopper frame member 30 is enclosed in an insulating rubber tube 33, so that it can be handled when the frame 30 is still hot. The lower end of each leg 31 and 32 is interiorly threaded at 34, and a stud 35 is threaded therein. Preferably a plastic fitting 36 surrounds the lower end of each leg 31 and 32, its upper end fitting under the lower end of the insulating rubber tube 33. The lower end of the fitting 36 is inset at 37 to provide a flange 38 so that it may fit upon and in an opening 41 through the closure plate 40.

The opening 41 extends through the thickened rim 42 of the plate 40 and is radially offset at 43. The stud 35 extends through the opening 41 and a lock nut 44 is tightened around its lower end so that the plate 40 is secured to the frame 30. An insulating washer 45, preferably, is provided between the plate 40 and nut 44.

The frame coupling

Preferably, the frame 30 is attached to the standards 11 and 12 by a coupling of the type shown in Fig. 4. A socket 50, secured around the lower end of each stud 35 by means of threads, is bored through radially by several holes 51, tapered inwardly. Each hole receives a ball 52 which is of larger diameter than the small end of the taper. The lower end of the socket is flared at 53 and acts as a stop to hold the collar 54. The collar 54, which preferably is a phenolic molding so that it can be handled when the machine is still hot, is slidably mounted on the socket 50. A spring urges the collar 54 normally down against the flange 53. In this lower position the inside wall of the collar 54 holds the balls 52 in the tapered holes with part of each ball projecting through the small end of its hole. When the collar 54 is lifted, its flare 59 moves up opposite the balls, and they are then free to move outwardly enough to allow each ball to move clear of the inner wall of the socket.

When the collar 54 is held in its upper position, a rounded and inset upper end 56 of the standard 11 or 12 may be inserted into the socket 50. If the collar 54 is then released, the spring 55 will push the collar down, which will push the balls 52 into the annular groove 57 on the end 56, so as to lock the parts together.

The hopper assembly

The hopper assembly, which comprises the frame 30, closure plate 40, hopper 60, and skirt 100, is separable as a unit from the rest of the apparatus when the latter is being cleaned or when the hopper assembly is stored so that it can be used for dry storage of hygroscopic materials, without having to put them back in their original container or some other container.

The hopper 60, itself, is preferably made of some lightweight, transparent material such as an acrylic resin, and comprises a lower, funnel-shaped portion 61 and an upper, generally cylindrical portion 62. The upper portion 62 is formed or molded with a recess or spline 63 (see Fig. 3) on each side to receive the legs 31 and 32 of the frame. Around the inside of the hopper 60 where the lower and upper portions 61, 62 meet, is a rim 64, and on it preferably rests a screen 65, which serves to keep large chunks of material from falling through into the lower section 61 (see Figs. 2 and 3).

The upper end of the hopper 60 is covered by a dome, preferably comprising two movable aluminum sections—an inner segment 70 and an outer segment 71. Both of these are pivoted to the upper rim of the hopper at 72 and 73 so that the inner segment 70 may be swung inside the outer segment 71 or the outer segment 71 may be swung around the inner segment 70 when the hopper 60 is to be filled. Inside a turret or enlargement 74 on the upper part of the segment 71, is an electrical socket 75 with a light bulb 76. Any other suitable heating element may be substituted. The heat from the bulb 76 serves to keep the interior of the hopper at an elevated temperature so that hygroscopic material is kept dry. The inner segment 70 protects the bulb 76 when the dome is opened. The deflection of heat by the aluminum dome helps maintain the hopper interior at an elevated temperature.

From the socket 75 an electric cable 77 leads to a main electrical connector 80 mounted in a bossed opening 81 through the closure plate 40, where all of the electrical controls are centralized. The plug 80 is compound and links the cable 77 with a main cable 82, which leads to a source of A.-C. current, and to a thermostatic control cable 83, which leads to a thermostatic switch 84 held by a bracket 85 on the lower surface of the plate 40. The switch 84 is thus in the dispensing chamber when the hopper 60 is mounted in position and is responsive to the temperature therein to connect or disconnect the main cable 82 with the heater cable 86 whose plug 87 fits into the main connector 80 (see Figs. 7 and 11). All of the electric lines are preferably grounded by a third wire.

To minimize heat transfer, the lower surface of the plate 40 is provided with insulator buttons 88 which rest on the surface 23 when the hopper assembly is installed (see Figs. 7 and 8). A large, off-center opening 89 through the plate 40 receives the mouth or discharge opening 90 of the hopper. An upper gasket 91 is provided between the mouth 90 and plate 40 and resiliently supports the weight of the hopper 60. A lower gasket 92 is also provided to cushion the hopper mouth 90 when it rests on the funnel 110 during operation.

Around the upper interior rim 66 of the hopper are one or more lugs 94 (see Fig. 2), from one of which is suspended a hooked rod 95 having at its lower end a ball stop or baffle member 96. When the hopper 60 is used for feeding granular material, this ball 96 hangs as shown in Fig. 2 and maintains an even head and therefore an even pressure on the granular material in the hopper mouth 90, funnel 110, and magazine 130, no matter how much salt is above the ball 96 in the hopper. By this means the salt is kept flowing evenly through the hopper opening. When it is desired to separate the hopper 60 from the rest of the apparatus, the handle 95 may be removed from its anchor 94 and the ball 96 lowered to close the hopper mouth 90.

The skirt 100 preferably is transparent and is slidable up and down around the hopper 60 (see Figs. 1 and 2). In its lower position the skirt encloses the dispensing chamber. Its upper gasket 101 fits against the upper closure plate 40, and its lower gasket 102 fits against the base ring 14. It can be easily raised and lowered by its handles 103, and may be retained in its upper position by inserting the elastic band 98 into the notches 104. The elastic band 98 encircles the hopper 60 just above the studs 97 (see Fig. 1). The skirt 100 remains in this upper position when the hopper assembly is removed from the dispensing unit.

The funnel head and the air circuit

The mouth 90 of the hopper 60 fits into the upper end of a funnel head 110. The funnel 110 is made integral with and is positioned on one side of the central frame member 20. On either side of the funnel 110 at its upper end are suitable supporting arms 111 which are engaged by the insulator buttons 88. The third button 88 rests on the upper end of the handle grip 113 at 112.

About half way down toward the mouth 114 of the funnel 110, the funnel side walls have two openings 115 (see Fig. 8) through which streams of dry compressed air are introduced inside the funnel 110. These dry air currents keep the particles separated and keep a free flow of material through the funnel. The air, before introduction into the funnel, preferably, is dried by suitable apparatus before it is piped into the air inlet fitting 120 in the hollow standard 11 (see Figs. 5 and 6). It is conducted up the passage inside the standard 11 to a fitting 121 in the leg 21 of the center frame, and from there the air passes through a metal tube 122 to a manifold 123 in the head of the central frame member 20. The manifold 123 distributes the air through two symmetrically located tubes 124 down into two air heating chambers 125. In each heating chamber 125 the air comes in contact with a large surface of copper wire, foil, or similar metallic material of high conductivity, which material is heated by the heater 200, described below.

There are two outlets from each air heater 125. One of these is through a tube 126 to the opening 115 and into the funnel 110. To keep the air openings 115 from being plugged by the granular material, an agitator rod 127 having a handle 128 is mounted in each opening 115 (see Fig. 8). The other opening 129 (see Fig. 14) from each chamber 125 allows a current of air to flow radially outwardly under the heater 200, through the notch 263, across the upper face of the measuring disc 130, and down through the slits 131 in the base ring 14 (see Fig. 9). This airstream scavenges any stray salt particles from the measuring disc and directs any steam and moisture away from the apparatus.

The metering disc and lower closure assembly

A rotatable spindle 132 (Fig. 6) is suspended from the central frame member 20 and is supported in it by suitable bearings. A handwheel 133 is pinned to the spindle 132 above the metering disc 130, which may or may not be formed integrally with the handwheel 133. A can turret or star wheel 134 is also secured to and drives the spindle 132. The disc 130 and the turret 134 are adjustable on the spindle 132, so that they can be aligned to dump the measured material in one opening 135 of the disc 130 when a can is in receiving position below. Preferably this is while the can is in engagement with an area 136 on the star wheel 134.

The metering disc 130 preferably is adjusted so that its upper surface is slightly below the level of the upper surface of the base ring 14 on which rests the flat base 201 of the heater 200. The disc, itself, includes a flat annular portion 137 having a plurality of regularly spaced cylindrical openings or pockets 135, corresponding in number to the turret arms 136. Since the quantity measure of each pocket 135 is determined by its depth and diameter, the same machine may be used to dispense different quantities by using a disc 130 which has the size of openings 135 desired. To facilitate cleaning of the machine at the end of the day's operation, the disc 130 has spokes 138 to support the annular portion 137 and connect it to the hub 139.

A metering disc shield 140 (Figs. 6 and 9) is preferably employed below the disc 130 to close off most of the bottom of the measuring and dispensing mechanism and thereby prevent access to these parts of any steam, vapor, moisture or cool air which may be present below the machine.

The shield 140 fits in an annular recess 143 formed in the bottom of the ring 14. It is retained therein by a stationary screw or lug 144 and an oppositely positioned spring latch 145 carried in a boss 147. The shield extends completely around the bottom except for an opening at 143 through which the measured material drops into the can, and except for the area covered by the swing shield 150.

The swing shield 150 is held in position by a spring mounted rod 151 extending into a tube 152 on the ring 14. Its purpose is to provide an easily removable section of the shield so that access to the shoe 190 may be readily had.

Perforations 155 are provided in the swing shield 150, so that salt which may fall on the swing shield may drop on through instead of building up there. These perforations do not admit sufficient air to nullify the protection of the shield 150, which gives sufficient closure as well as protection against splashes and sudden currents of steam or air.

The swing shield 150, the shield 140, and the base ring 14 together form a substantially closed lower wall for the dispensing chamber. The closure plate 40 forms the upper wall of the chamber and the skirt 100 forms the side wall. This provides a substantially closed, heated chamber for the dispensing mechanism and makes possible maintenance of atmospheric conditions dry enough for dispensing even calcium chloride.

The magazine

A spring mounted magazine 160 is provided for loading each pocket 135 in the measuring disc 130, and it rests or floats lightly on the top of the measuring disc (Figs. 7, 8, 15, and 16). The mounting of the magazine is such that it imposes a minimum of friction on the disc. This is important because the disc is sometimes turned by the very light pressure of a can engaging the star wheel 134.

The function of the magazine is to deposit the salt or other material in the pockets of the measuring disc. The particular magazine structure described here has been found especially effective in preventing partially filled pockets and uneven measurement.

The magazine 160 comprises two pieces 161 and 162, both of which are cup-shaped and have slanting interior walls. The lower piece 161 has a flat bottom surface 163. It engages or floats on the measuring disc 130 and levels the salt in the opening 135, as the measuring disc slides under it. Its upper surface 164 is also substantially flat, and receives the upper piece or rim 162. The bottom inside edge 165 of the rim is inset radially from the inside upper edge of the lower piece 161. This provides a projecting ledge 165 around the upper rim of the magazine. Preferably the outlet 114 from the funnel 110 is below the level of the ledge 165. As will be pointed out later, the shape of the bottom opening in the magazine is important. It is generally oval with the long dimension lying in the path traveled of the pockets 135 below it. Also, at the ends of the oval it has inverse circular arc portions 166, which somewhat coincide with one wall of the pockets 135.

These parts function as follows: Salt spills into the magazine from the outlet 114 and as it fills the lower piece 161 the level of the salt climbs higher in the piece 161. As the measuring disc revolves, the salt in the lower piece 161 will be urged laterally in the direction of disc movement with such force as to gradually raise the level of the salt to the ledge 165, without which the salt would eventually overflow the end of the magazine. This construction provides an even flow through the magazine 160 onto the disc 130.

The magazine construction shown makes possible the removal of the closure plate 50 in the bottom of the feed tube 36 in our earlier Patent No. 2,299,717. This closure plate forms a bottom in the feed tube and the flow of salt from the feed tube to the magazine was in a generally horizontal direction through openings around the lower end of the feed tube wall. The presence of lumps in the salt would result in sluggish flow or stoppage of salt if the lumps were too large to pass through the restricted wall openings; with an open bottom feed tube, a lump small enough to enter the top of the tube will readily pass downward to the magazine and be sheared off and broken up by the movement of the pockets in the disc.

The second advantage of the magazine comes from the sloping walls which incline toward the magazine outlet. They allow the salt in the magazine to flow readily to supplement the flow of the salt in the tube when the pocket is below the outlet. Then the magazine refills from the tube during the interval between pockets. This produces a sort of pulsating effect in the magazine and is important in getting a quick loading of the pocket in the short interval it is below the magazine.

A third advantage of the magazine comes from the particular shape of its outlet which might be described as generally oval, minus two oppositely positioned inverse circular arcs 166 in the path of the leading and trailing edge of the moving pockets. The inverse circular arc 166 over the leading edge of the pocket substantially coincides with the edge of the pocket and effects a wide opening the instant the filling starts. Likewise the circular arc 166 over the trailing edge will be a wide opening up to the instant of closing. This means the oval shape with the inverse arc gives a larger effective filling interval for a given arc of movement of the pocket, as compared with a circular opening of a diameter corresponding to the distance between the inverse circular arcs. Such a circle is indicated by the dotted lines X in Fig. 15.

By having a magazine opening of a maximum capacity for a minimum arc of movement of the pocket, it is possible to fill pockets suitable for salting all the commercial can sizes with a minimum size of shoe and a fixed discharge point in relation to the can conveyor. This means the only change in metering salt to various sized cans is to change the disc 130 and star wheel 134. The reasons a short shoe is important are that for the sake of user convenience the machine should operate both ways—i. e., forward and backward—and each can must clear before the next can, if any, is filled, thus making it imperative to dump the salt as near the tangent point of the disc pockets as possible. The latter point ties to the fact that the can pushing is the can filled. Thus if there is an interval in cans on the conveyor, there will be no salt dumped with no can to receive it, and no can without salt when the next can comes down the conveyor.

A fourth advantage of the magazine 135 is that the sloping wall and ledge 165 over the inverse arcs 166 prevent spilling of the salt over the edge of the magazine as the disc 130 tends to carry it from one end of the magazine to the other, and also the ledge 165 tends to deflect the salt back along each side wall to keep the other end of the magazine filled. Another advantage is that the ledge and sloping wall structure makes possible a magazine of a minimum vertical height, thereby greatly facilitating its ready removal for cleaning and inspection. Another advantage of the ledge idea is that it minimizes the distance which the feed tube 110 must extend down into the magazine. In normal operation of the machine there will be only a small amount of salt bearing against the outside edge of the tube and that will be only the edge in the end of the magazine where the disc is tending to pile up the salt. This means that there will not be an accumulation of salt in the hopper burying the lower end of the feed tube and thereby interfering with the flexible and free movement of the magazine on the disc.

To keep the magazine aligned on the disc 130, the magazine has vertically extending guide slots 168 on its opposite outer walls, each of which receives a fixed ball-end guide stud 170 supported on bosses 171 on the base ring 14.

To obtain the gentle floating action of the magazine on the disc 130, a spring-pressed, L-shaped rod 175, with a finger 176, is fitted into a recess 167 on each side of the magazine. Each rod 175 is mounted inside a tubular boss 177 which depends from the funnel housing 110. Any desired tension is obtained by adjusting a cap 179 to vary the compression on a spring 178 carried in the boss 177 and pressing on one end against a flange on the rod 175 and on the other end against the top of the cap.

The spring pressed rods 175 make possible a very quick and easy removal of the magazine. This is important because after each day's operation a thorough cleaning of all the parts is advisable. Otherwise, overnight any salt or calcium chloride will harden and lump. To remove the magazine the operator lifts up on the rods 175 until the magazine clears the studs 170. Then he tilts the magazine until one edge will slide beneath the bottom 114 of the funnel 110. This tilting also removes the rod fingers 176 from the recesses 167 in the magazine.

The shoe

The only time the lower end of the measuring pockets 135 need to be closed is the interval when each pocket is below the magazine and for its movement from that position until it dumps the salt into the can. In the present machine this interval is for about 40 degrees of its rotation. It may be more or less. However, as explained in connection with the magazine, an important operating characteristic is to have the shoe as short as possible, which the oval inverted arc opening makes possible.

The closure of each pocket during the above interval is effected by a shoe 190 which bears gently against the bottom of the measuring disc 130. As in the case of the magazine, this pressure should be kept to a minimum.

The shoe comprises a segment of a ring and preferably has a depressed center 194 with a rim 193 in a plane to bear against the bottom of the measuring disc. The depressed center will fill with salt so that the net amount measured into each pocket will be the volume of the pocket. As the filled pocket is moved off the shoe, the contents of the pocket fall through the opening 142 into the can which accomplished the moving of the disc by contact with the star wheel 134.

The shoe has a U-shaped supporting member 191 which is adjustable in suitable holes by set screws 195. When in position, the bottom of the U surrounds the supporting tube 180 and gauges the radial position of the shoe.

Vertical support of the shoe is obtained by a rod 181 having a ball 183 mounted on its bent end 182. The end 182 fits in a slot 192 in the bottom of the shoe and prevents lateral displacement of the latter. The rod 181 is yieldably supported in a tube 180 by a spring 184 and the compression on this spring is regulated by a nut 185 threaded on the end of the rod 181.

When the operator is cleaning the machine he has a choice of completely removing the shoe or of removing the end 182 from the slot 192 and allowing the U-member 191 of the shoe to hang on the end 182. In this latter position the shoe will drain easily during the cleaning operation.

The heater

To maintain an even, elevated temperature inside the dispensing chamber and to keep all the parts therein warmed, a heater 200 is provided (see Figs. 11, 12 and 13).

It comprises a plate segment 201 shaped to conform to and overlie the measuring disc 130, except in the vicinity of the magazine 160. Perforations 202 facilitate inspection of the pockets 135 as the measuring disc rotates. The plate 201 is supported on the base ring 14 between the legs 21 and 22 of the main frame 20. The plate 201 has a snug fit with the air heater chambers 125 under which it projects so that there is a maximum of heat conduction to the air heaters. As mentioned earlier, there is a notch 203 in the forward bottom surface of the plate 201 which heats, guides and deflects the air current across the top of the measuring disc 130 (Fig. 14).

The plate 201 is heated by one or more electrical heating elements 204. Two are shown here as they have proven adequate. Each is contained within a housing 205 secured to the plate 201. The housing has a sloping roof 206 against which the electrical heating element 204 contacts. This contact is maintained by means of a wedge-shaped lower support 207 for the heating element and a spring 208 which applies constant pressure to the wedge. Heat is thus communicated by contact of the heating element with the roof of the housing and with the wedge, which in turn is in contact with the plate 201.

A suitable electric lead-in circuit is shown at 86. The insulated sockets 210 and cord 86 provide a handle by which the heater 200 may be taken out of the machine while the heater is still hot. The electrical wiring insulation thus provides the only handle needed.

In addition to the foregoing advantages, this heater plate 201 is readily removable by the operator for the cleaning operation. Another advantage of the wedge device is that new heating elements can be installed by any electrician, and the wedge will make certain that there is the necessary firm contact between the elements, the shell, and the wedge.

Operation

The problems solved by this dispensing machine have been those existing heretofore, particularly in the canning industry where salt or calcium chloride in uniform amounts is added to each can. These materials are hygroscopic, and particularly is this true of calcium chloride. Heretofore no machine has been available to dispense calcium chloride in a cannery. Around a cannery there is usually escaping steam from the cookers, moisture from the washing machines, vapors rising out of the filled cans, and generally a very humid atmospheric condition. The present machine is able to dispense hygroscopic materials under any or all of the above adverse conditions.

The machine is installed alongside the can line conveyor with the star wheel 134 extending into the path of the cans so that each can will engage an arm 136 and give it a partial rotation. This partial rotation will carry a measuring pocket 135 from under the magazine 160 into the position shown in Fig. 9 so that the contents of the pocket will fall through the opening 142 into the can. This is repeated as each can rotates the star wheel.

At the start of each day's operation the operator turns on the electric current which lights the globe 76 in the hopper dome and turns on the heater 200. When the dispensing chamber is warmed past a preselected temperature, the thermostat 84 turns off the heater circuit, but the light 76 burns continuously. Compressed air is admitted through the fitting 120 and thence to the funnel 110 as well as out through the slots 131.

In the hopper, the hand rod 95 is suspended from one of the lugs 94, and the ball stop 96 is held above the hopper mouth 90 so that the material will pass through it under constant pressure into the funnel 110. The transparent walls of the hopper 60 show when the salt is getting low, and from time to time the inner dome segment 70 may be swung into the outer segment 71, or the outer segment 71 may be swung around the inner segment 70 and fresh material poured inside the hopper 60, where it is strained through the screen 65.

As salt passes through the funnel 110, the particles are kept separated by the air current. If one of the air openings 115 should become plugged by the material, the rod 127 may be moved to free the opening.

From the mouth 114 of the funnel 110, the material falls into the magazine 160, the sloping walls of the magazine and the inset edge 165 of the upper magazine section, serving to prevent any overflow. The bottom of the magazine is closed by the disc 130, except when a measuring pocket 135 passes beneath it. The pocket then fills up and stays full until it is moved over the edge of the shoe 190 which allows it to empty into a can.

The air currents directed under the heater 200 through the notches 203 scavenge any remaining particles from the top of the disc 130 and carry them out through the slits 131—at the same time blowing away any moisture or steam which may be lurking in the vicinity of the dispensing mechanism.

During all this time the operations may be watched through the transparent skirt 100 and the transparent hopper 60.

When, for any reason, it is desired to separate the hopper assembly from the dispensing apparatus, the stopper 95 should be lowered to close the hopper mouth 90. Next the skirt 100 is raised, and is held in its raised position about the hopper 60 by the elastic band 98. Then the heater 200 must be unplugged. The machine is then ready to be separated by raising each flared collar 54 against the spring 55, to free the socket connections on the standards 11 and 12. The hopper assembly may then be set aside, to rest on the sockets 50, buttons 88 and gasket 92. In this condition the salt may be left in the hopper overnight or for longer periods of storage.

At the end of each day's run the hopper should be removed as above described. Then the heater 200 should be removed. Next the swing shield 150 is depressed. It may be swung around to the front of the machine, and the shield 141 may then be removed by pulling down the ring 145, and rotating the shield until it will clear the legs 11, 12, and 13. Then the magazine 160 should be removed and the shoe 190 should be dropped down so that it is hanging from the arm 182, or the shoe should be removed. In this condition the dispensing assembly may be steam cleaned and allowed to dry during the shut down. When placed back in use, the machine is put together in the reverse order.

We claim:

1. A dispensing and measuring machine adapted to handle hygroscopic granular materials comprising a lower dispensing and measuring unit, and a separable upper hopper and storage unit; said lower unit including a base frame, a measuring device moving in an opening therein, a funnel for conveying said material to said measuring device, an upper closure plate located near the top of said funnel, a plurality of legs supporting said frame and said closure plate and terminating above said plate, and means for actuating said measuring device to deposit a predetermined amount of said material; said upper unit including a U-shaped frame with the legs of the frame engageable with legs of said lower unit, latch means for releasably fastening said frame to said legs, a transparent body enclosure member secured to said frame, said body including a hopper and a cover, and an outlet from said hopper into said funnel.

2. The device of claim 1 in which a skirt encloses said lower unit between said base ring and said upper closure plate.

3. The device of claim 2 in which said skirt is transparent.

4. The device of claim 2 in which said skirt slides upwardly and becomes a part of the upper unit when the latter is to be detached.

5. The device of claim 2 in which there is independent heating means in said upper and lower units for maintaining a dry atmospheric condition in each.

6. The device of claim 2 having a heating means mounted over said measuring device and which means is removable to allow access to said measuring device for cleaning.

7. The device of claim 2 having a closure plate secured below said base frame, said plate having an opening to pass measured material into a can.

8. The device of claim 7 in which the closure plate is open below said measuring means and a separate swingable shield fills said opening.

9. A non-spilling magazine adapted to float its bottom on the upper surface of a measuring wheel having pockets and to receive a supply of granular material from a hopper outlet which extends inside the mouth of said magazine; comprising a lower body portion having a hole in its bottom and its top, and an upper body portion which extends radially inwardly from the top edge of said lower body portion, but does not engage said outlet.

10. The magazine claimed in claim 9 in which the sides of the bottom opening, which lie transverse to the path of the object to be filled, are shaped in the form of inverse circular arcs.

11. A receiving and dispensing magazine comprising a lower body member having a substantially vertical passage therethrough, the interior walls sloping inwardly toward the bottom and a similarly shaped upper body member, mounted on top of said lower member and having its lower end horizontally inset from the upper end of said lower member.

12. The magazine claimed in claim 11, in which the sides of the bottom opening which lie transverse to the path of the object to be filled, are shaped in the form of inverse circular arcs.

13. In a dispensing apparatus having measuring means for releasing its contents and a hopper having a discharge opening spaced above its measuring means, the combination therewith of a receiving and dispensing magazine, adjacent said discharge opening and with its lower end slidably engaging said measuring means; said magazine comprising two sections, a lower section having inwardly and downwardly sloping walls and a similarly shaped upper section inset horizontally from the upper edge of said lower section.

14. The magazine claimed in claim 13 in which the opening in its lower end is shaped to conform at each side with the openings in the measuring means, whereby a slit is uncovered at the initial movement of each opening under the magazine.

15. The magazine claimed in claim 13 in which the sides of the opening which are generally transverse to the path of movement of the measuring means comprise inverse circular arcs of a radius corresponding to the openings in said measuring means.

16. In a dispensing apparatus the combination of measuring means having provision for releasing its contents; a hopper for comminuted material having a discharge means at its lower end slidably engaging said measuring means; means enclosing said discharge means and said measuring means except for two outlets therefrom, one a contents-releasing outlet, and the other an air current outlet adjacent and outside said contents-releasing outlet; means for maintaining said hopper, said discharge means, and said measuring means within a pre-selected temperature range above room temperature; and means for directing a blast of air out through said air current outlet so as to deflect outside moist air away from said contents-releasing outlet.

17. In a dispensing apparatus, the combination of measuring means having provision for releasing its contents; a hopper for comminuted material having a discharge opening at its lower end; a receiving and dispensing magazine adjacent said discharge opening in lateral spaced relation thereto, its lower end slidably engaging said measuring means; a housing enclosing said discharge opening, said magazine, and said measuring means and having two outlets therefrom, a contents-releasing outlet from said magazine and an air-current outlet outside said contents-releasing outlet and adjacent thereto; means for maintaining said hopper, said magazine, and said measuring means within a pre-selected temperature range above room temperature; and means for directing a stream of heated air across the top of said measuring means and down through said air current outlet, whereby stray material is removed from within said housing and the outflowing air stream deters entry of outside air in through said contents-releasing outlet.

WILLIAM J. EMMONS.
BERNARD S. GALLAGHER.

References Cited in the file of this patent
UNITED STATES PATENTS

| Number | Name | Date |
|---|---|---|
| Re. 19,174 | Hume | May 22, 1934 |
| 582,697 | Schneider | May 18, 1897 |
| 895,377 | Kunz | Aug. 4, 1908 |
| 988,420 | Willard | Apr. 4, 1911 |
| 1,086,647 | Cochran | Feb. 10, 1914 |
| 1,470,232 | Duckett | Oct. 9, 1923 |
| 1,892,627 | Pearson | Dec. 27, 1932 |
| 1,952,589 | Guenst | Mar. 27, 1934 |
| 1,993,587 | Bird | Mar. 5, 1935 |
| 2,009,979 | Abbott | July 30, 1935 |
| 2,293,160 | Miller et al. | Aug. 18, 1942 |
| 2,345,074 | Sargent et al. | Mar. 28, 1944 |
| 2,453,080 | Shimp | Nov. 2, 1948 |
| 2,473,474 | Keane | June 14, 1949 |
| 2,503,233 | Hall | Apr. 4, 1950 |